AARON WISSLER & JACOB GAMBER.
Improvement in Horse Powers.
No. 121,740.
Patented Dec. 12, 1871.
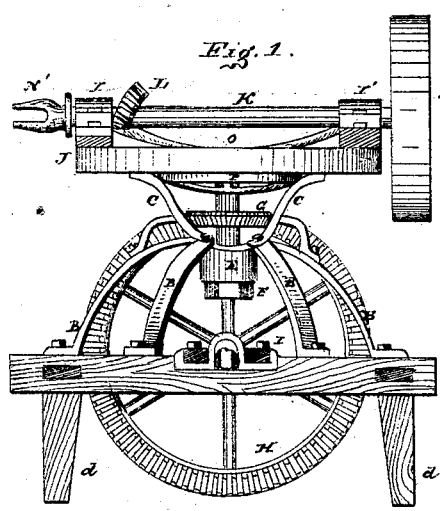
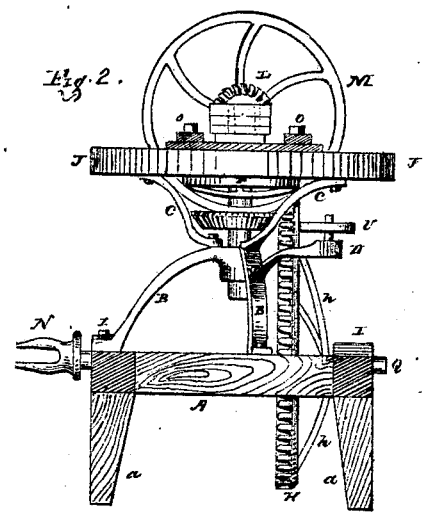
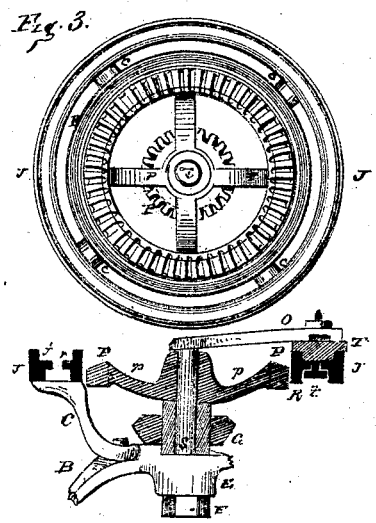
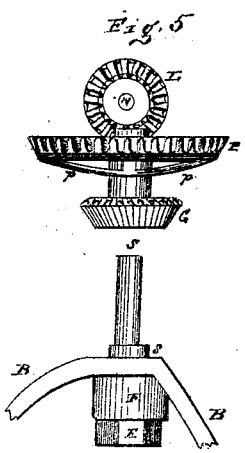
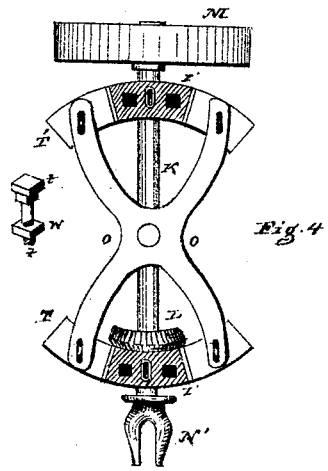
Witnesses.
W. B. Wiley
Jacob Stauffer
Inventors.
Aaron Wissler
Jacob Gamber 121,740

UNITED STATES PATENT OFFICE.

AARON WISSLER, OF BRUNERSVILLE, AND JACOB GAMBER, OF PETERSBURG, PENNSYLVANIA.

IMPROVEMENT IN HORSE-POWERS.

Specification forming part of Letters Patent No. 121,740, dated December 12, 1871.

*To all whom it may concern:*

Be it known that we, AARON WISSLER, of Brunersville, and JACOB GAMBER, near Petersburg, both of Lancaster county, in the State of Pennsylvania, have invented a new and useful Improvement in Jacks for Transmitting Horse or other Power; and we do hereby declare that the following is a full and exact description thereof, which will enable others skilled in the art to make and use the same, reference being had to the accompanying drawing forming a part of this specification, in which—

Figure 1 is a front elevation; Fig. 2, an end elevation; Fig. 3, a top view of the circular cam-way and central gear, with a sectional vertical view in part from J to J; Fig. 4, shows the top shaft-gear and cross-guides or spider, separately shown as removed from the top view shown by Fig. 3; Fig. 5, detached portions separately shown.

Similar letters of reference indicate corresponding parts.

Our invention has for its object to provide a jack which is universally applicable for transmitting motion from a horse or any other power to machinery in any desired direction, by making the belt-wheel with its shaft and pinion in such a manner as to revolve horizontally around the entire circle, thus enabling it to be adjusted and set at any desired angle without changing the position of the jack when once firmly fixed, so as to transmit the power from one machine to that of another, whether on the same floor or in an adjoining floor of a barn; or when it becomes necessary to shift the thrashing-machine or the like, or the horse-power, as frequently happens. The motion can also be reversed without the necessity to twist the belt. In short, this jack can be used under circumstances often arising which precludes the use of the ordinary jack heretofore employed.

The stout frame-work A' A supports a horizontal shaft, Q, with a coupling-knuckle or universal joint or connection, N, to which the power is applied. This shaft has a large bevel-cogged wheel, H, which meshes into a horizontal pinion, G, combined with a large cogged wheel, P, within the cam-ways J R, as shown by Fig. 3, and detached, Fig. 5. These cam-ways have an open space between them and flanges raised above the central ledges *j r*, which also project so that the sliding segments T, with the upper sides projecting and confined in the bed of the cam-ways by the side flanges, move freely. A headed bolt passes up through the sliding segments. The head *t*, coming under the projecting sides of the cam-ways J R, penetrates the slotted ends of the cross-braces or spider O, to which they are secured by a nut or thumb-screw, W, by which the spider O can be adjusted. The sliding segments T T' support, centrally, boxes I', for shaft K, Fig. 4, bearing on one end the belt-wheel M; also inside the sliding segment T of the opposite end a bevel-pinion, L, which receives motion from the horizontal beveled-wheel P aforesaid, and with which it remains in contact. However the direction of the shaft K or the belt-wheel may be in respect to other fixed parts of the jack, the action of the gear is always the same; yet the direction of the motion may be reversed by turning the belt-wheel from the one side of the jack to the opposite side. In order to shift the belt-wheel it is only necessary to slacken the binding-screws or nuts *t* on the ends of the spider-arms *o*, when the whole appliance, Fig. 4, can be turned upon the circular cam-ways and again secured at the desired point. The upper shaft K is also terminated by a knuckle or jointed coupling, and is only used to form a connection with a tumbling-rod, used on some machines.

The object of this jack is mainly for use with horse-power and thrashing-machines; but is equally well adapted for steam or water-power or any kind of machinery.

We would mention here that our first arrangement or plan for revolving the belt-wheel and its shaft and pinion was in making use of a box for the end of the shaft, mounted on the central upright shaft *s*, requiring in that case but half the length of the shaft and half the spider *o*, or its equivalent, for keeping the boxes in a line; also using in that case only one sliding segment, T, with its box I'; but for various reasons, for utility and more satisfactory results, abandoned the former plan and adopted the present, as also shown in our caveat entered in May, 1870.

The drawing shows the brackets *c* which sustain the cam-ways, and their connection with the supports B mounted on the frame, centrally united into a step or bearing for the central shaft S with its enlarged collar *s* on the face of the hub E, secured by the nut F, the combined wheel and pinion P G set on the collar s of the central shaft S.

The operation is readily understood without further explanation on inspection of the drawing and letters of reference.

We are not aware of any arrangement for revolving the strap-wheel, substantially as herein shown and specified.

What we claim, and desire to secure by Letters Patent, is—

1. The shouldered sliding segment or segments T T′, which carry the box or boxes I′ for the upper shaft K with its belt-wheel M and pinion L, arranged and operating substantially in the manner specified.

2. The concentric circles J R with their projecting base j r, in combination with the sliding segments T T′, bolts t w, and cross-bars or spider O having slotted adjustable ends, jointly arranged and operating in the manner and for the purpose substantially as shown and mentioned.

3. The combined crown-wheel P and pinion G, in combination with the vertical shaft S, mounted in the manner shown, so as to be operated by the driving-wheel H and impart motion to the adjustable pinion L at any point of the circle, all arranged substantially in the manner and for the purpose described.

AARON WISSLER.
JACOB GAMBER.

Witnesses:
WM. B. WILER,
JACOB STAUFFER.

(159)